O. W. Stow.

Gauge for Shears.

N°. 104,076.    Patented Jun. 7, 1870.

Witnesses
H. B. Dodge
C. A. Shepard

Inventor
Orson W. Stow
By James Shepard Atty.

United States Patent Office.

ORSON W. STOW, OF PLANTSVILLE, CONNECTICUT.

Letters Patent No. 104,076, dated June 7, 1870.

IMPROVEMENT IN GAUGE ATTACHMENT FOR TINSMITHS' SHEARS.

The Schedule referred to in these Letters Patent and making part of the same.

I, ORSON W. STOW, of Plantsville, in the county of Hartford and State of Connecticut, have invented a new and improved Gauge Attachment for Tinsmiths' Shears, of which the following is a specification:

My invention consists of the employment of a fixed and movable gauge, arranged at right angles to each other, and secured to a proper clamp, by which said gauges can be attached to the blade of an ordinary tinsmith's shears, as hereafter described.

In the accompanying drawing—

Figure 1:
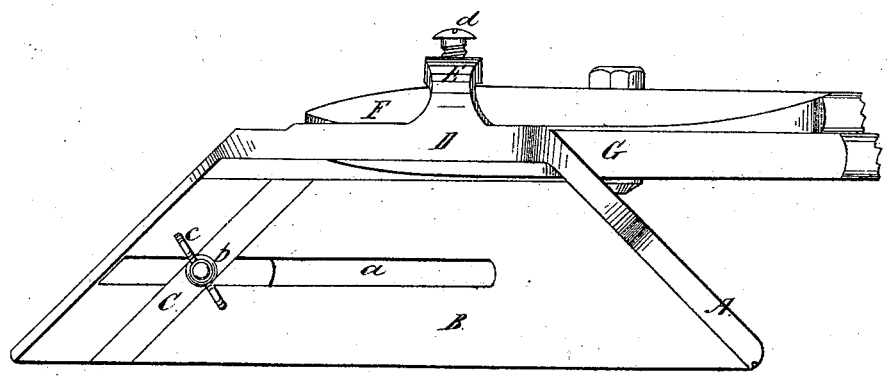
Figure 2:
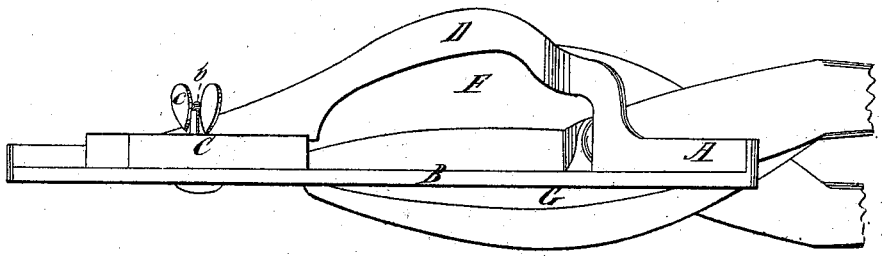

Figure 1 is a top view of my attachment, secured to the blade of an ordinary tinsmith's shears, and Figure 2 is a front view of the same.

A designates a gauge permanently secured to the plate or table B at an angle of forty-five degrees to the same.

The plate B is provided with a slot, a, running parallel with said plate.

C designates an adjustable gauge, which also stands at an angle of forty-five degrees to the plate B, and at right angles to the gauge A.

A portion of the gauge C extends into the slot a to prevent said gauge from changing its angle.

By means of a screw or bolt, b, and thumb-nut, c, the gauge C can be set at any desired distance from the gauge A.

From each end of the plate or table B extends a yoke, D, which is provided with an arm, E, and set-screw, d, which form a suitable clamp by which the device is readily secured to the upper shear-blade F.

The face of the yoke D should be parallel to the length of the plate B, so as to bring the gauges A and C at angles of forty-five degrees to the cutting edges of the shear-blades F and G.

In a large variety of tinsmiths' work it is customary to clip the corners of the metal being worked. It is essential to a neat job that such corners should be clipped evenly, and at an angle of forty-five degrees to the edges of a square sheet. Ordinarily, tinsmiths' bench shears are arranged for use with the upper blade stationary, and are operated by moving the lower blade only.

After securing the device to the upper blade F, as shown, the blades F G are opened and the corner of a sheet-metal plate passed between them until two of its edges rest against the gauges A C, when the blades are closed and the corner clipped at the required angle. By adjusting the gauge C to or from the gauge A, more or less of the corner of the plate being worked may be clipped, as desired.

By my invention, the ordinary tinsmiths' shears are provided with a convenient corner-cutting gauge.

I claim as my invention—

The combination of the gauge A, plate or table B, and adjustable gauge C, the whole constructed and arranged so as to be attached, by clamping mechanism, to an ordinary tinsmith's shears, substantially as described.

ORSON W. STOW.

Witnesses:
FREDERICK SUTLIFF,
JAMES SHEPARD.